(12) United States Patent
Jensen

(10) Patent No.: US 6,323,981 B1
(45) Date of Patent: Nov. 27, 2001

(54) METHOD AND APPARATUS FOR DETECTING INTERMITTENT FAULTS IN AN OPTICAL COMMUNICATION SYSTEM

(75) Inventor: Richard Andrew Jensen, Red Bank, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/182,742

(22) Filed: Oct. 29, 1998

(51) Int. Cl.[7] .............................. H04B 10/02; H04B 10/08
(52) U.S. Cl. .......................... 359/177; 359/110; 359/187
(58) Field of Search .................................. 359/158, 159, 359/173, 188, 187, 110, 177

(56) References Cited

U.S. PATENT DOCUMENTS 5,453,865 * 9/1995 Faulkner et al. ..................... 359/110
5,825,515 * 10/1998 Anderson ........................... 359/110

* cited by examiner

*Primary Examiner*—Jason Chan
*Assistant Examiner*—Christina Y Leung

(57) ABSTRACT

A method is provided for locating an intermittent fault occurring in an optical transmission system that includes a plurality of repeaters extending along first and second optical transmission paths for supporting bi-directional communication. In accordance with the method, a measurement is obtained of the gain imparted to a test signal along a round trip path between its originating point and each repeater. For each repeater there are identified changes in gain beyond a prescribed threshold and the time when the gain changes occur. A record of transmission performance data occurring over time is received. The performance data may be a bit error rate, SONET overhead data, or forward error correcting metrics, for example. For each repeater, a correlation in time is established between the identified gain changes and the transmission performance data. A fault location is identified based on the established correlation.

30 Claims, 4 Drawing Sheets

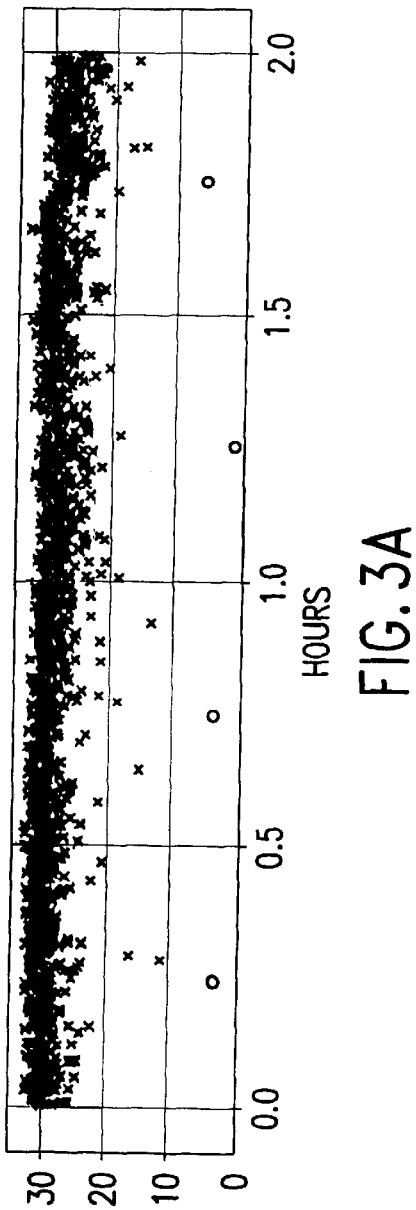
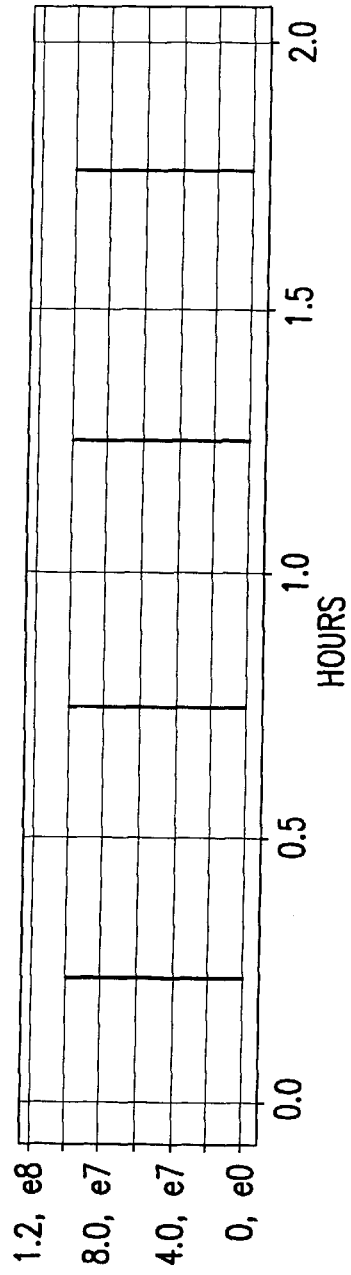

METHOD AND APPARATUS FOR DETECTING INTERMITTENT FAULTS IN AN OPTICAL COMMUNICATION SYSTEM

FIELD OF THE INVENTION

The present invention relates to an optical communication system and more particularly to a system for monitoring an optical communication system to locate intermittent faults.

BACKGROUND OF THE INVENTION

In long distance fiber optic communication systems it is important to monitor the health of the system. For example, monitoring can be used to detect faults or breaks in the fiber optic cable, faulty repeaters or amplifiers or other problems with the system.

Prior art monitoring techniques include the use of a testing system which generates a test signal and modulating the test signal onto a single channel (or wavelength) with the transmitted data signal. For example, the data signal may be amplitude modulated by the test signal. A loop-back coupler within an optical amplifier or repeater located downstream is used to return a portion of the transmitted signal (data signal plus test signal modulation) to the testing system. The testing system then separates the test signal from the data signal and processes the test signal to examine the health of the transmission system. U.S. Pat. Nos. 4,586,186 and 4,633,464 to C. Anderson et al. discloses a similar technique to modulate test response information from a repeater onto the main data signal to monitor the health of the system.

There are several disadvantages and drawbacks, however, with the prior art monitoring systems. Due to the low signal to noise ratio of the returning test signal, measurements must be taken over a significant period of time. To properly assess the status of the communication system requires that data be collected over periods ranging from about a half hour when the system is out-of-service to about eight hours when the system is in-service. Therefore, if the monitoring system is to detect a fault, the fault must be manifest over the time period that the data is collected. Accordingly, the previously mentioned line-monitoring techniques are most effective in locating static faults. Intermittent faults, however, will go undetected if their duration is substantially less than the time over which monitoring statistics are collected.

Therefore, there is a need for a line monitoring system that can locate intermittent as well as static faults.

SUMMARY OF THE INVENTION

The present invention provides a method for locating an intermittent fault occurring in an optical transmission system that includes a plurality of repeaters extending along first and second optical paths for supporting bi-directional communication. In accordance with the method, a measurement is obtained of the gain imparted to a test signal along a round trip path between its originating point and each repeater. For each repeater there are identified changes in gain beyond a prescribed threshold and the time when the gain changes occur. A record of transmission performance data occurring over time is received. The performance data may be a bit error rate, SONET overhead data, or forward error correcting metrics, for example. For each repeater, a correlation in time is established between the identified gain changes and the transmission performance data. A fault location is identified based on the established correlation.

In accordance with one particular embodiment of the invention, a method is provided for locating an intermittent fault in an optical transmission system that includes first and second optical transmission paths for supporting bidirectional communication. Initially, an optical test signal is generated, which is based on a tone modulated with a pseudo-random sequence. The test signal is combined with a data signal traveling on the first transmission path of the transmission system. A portion of the combined test and data signal is coupled through a loop-back path associated with a repeater situated along the first and second transmission paths so that a returning signal travels along the second transmission path. At least a portion of the returning signal is received, along with a delayed rendition of the test signal that is delayed in time based on the location of the repeater. The returning signal and the delayed rendition of the test signal are correlated to determine the gain imparted to the test signal along its round trip path between its originating point and the repeater. Finally, the gain values are correlated with transmission performance data stored in a receiving terminal to determine the fault location.

BRIEF DESCRIPTION OF THE DRAWINGS

FIG. 3(a) shows LMS monitoring data obtained over two hours from a repeater located at the site of a simulated fault.

FIG. 3(b) shows transmission performance data for the two hour period monitored in FIG. 3(a).

DETAILED DESCRIPTION

Figure 1:
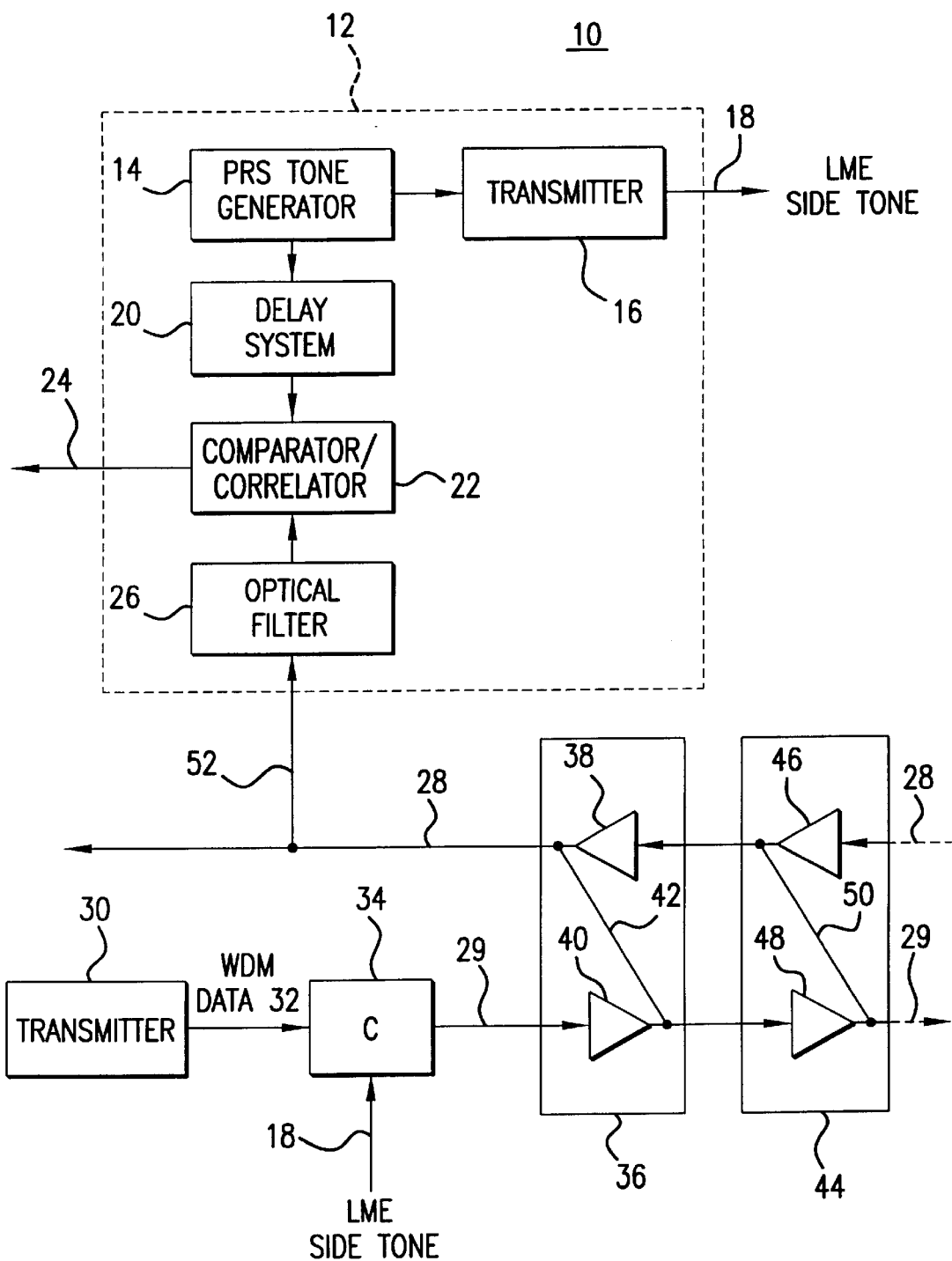
FIG. 1 illustrates a monitoring system 10 in accordance with the present invention.

FIG. 1 illustrates a monitoring system 10 in accordance with the present invention. Monitoring system 10 includes line monitoring equipment (LME) 12 for monitoring the health of a telecommunications transmission system, such as a fiber optic transmission system. LME 12 includes pseudo-random sequence (PRS) tone generator 14 connected to laser transmitter 16 for generating and outputting a pseudo-random sequence used to modulate a tone. Laser transmitter 16 generates a low level AM signal on the data signal based on the tones generated by PRS tone generator 14.

LME 12 also includes a delay system 20 connected to PRS tone generator 14 for delaying the tones received from PRS tone generator 14. LME 12 further includes an optical filter 26 for selectively transmitting one or more wavelengths or channels, while blocking the transmission of other wavelengths.

Comparator/correlator 22 is connected to delay system 20 and optical filter 26. Comparator/correlator 22 correlates the outputs of optical filter 26 and delay system 20 using well known digital signal processing techniques. Comparator/correlator 22 outputs a result 24 of the correlation operation, which is used by a computer or other systems (not shown) to diagnose faults or problems in the optical transmission system.

LME 12 is connected to a portion of an optical transmission system. The optical transmission system includes a laser transmitter 30 and an optical fiber pair, including fibers 28 and 29, for carrying optical signals. Fibers 28 and 29 can be the long distance optical fiber lines for deployment, for example, under the ocean. Optical fibers 28 and 29 are unidirectional fibers and carry signals in opposite directions.

Fibers 28 and 29 together provide a bidirectional path for transmitting signals. While the monitoring system according to a disclosed embodiment of the present invention monitors a transmission system that includes two unidirectional fibers 28 and 29, the present invention may be used to monitor transmission systems employing a single bi-directional fiber.

Laser transmitter 30 transmits optical data on a plurality of channels (or wavelengths) over fiber 29. Laser transmitter 30 can comprise a plurality of laser transmitters each transmitting an optical data signal over fiber 29 using a different channel or wavelength. A plurality of data signals each at a different wavelength are sent over fiber 29 using wavelength division multiplexing (WDM). Alternatively, only a single channel of data may be carried on fiber 29. Similarly WDM data signals may be carried over fiber 28, but traveling in a direction opposite of those signals on fiber 29.

A coupler 34 combines the WDM data 32 from transmitter 30 and the LME tone 18 from transmitter 16 and outputs this combined signal for transmission onto fiber 29. A first optical repeater 36 receives the combined signal from coupler 34. Repeater 36 includes amplifiers 38 and 40 for amplifying optical signals transmitted over fiber 28 and 29, respectively. Repeater 36 also includes a loop-back coupler 42, which returns a portion of the signal being transmitted on fiber 29 to fiber 28 for transmission to LME 12. Similarly, a second optical repeater 44 includes amplifiers 46 and 48 and loop-back coupler 50. Additional optical repeaters, including their associated loop-back couplers, are connected to fibers 28 and 29 for periodically amplifying and returning signals thereon.

Signal 52 is connected to the end of fiber 28 and carries all signals present on fiber 28, including the combined WDM data 32 and the amplitude modulated tones 18 returned by loop-back couplers 42 and 50 returned over fiber 28. Signal 52 is input to optical filter 26. Optical filter 26 is wavelength selective and passes only the wavelength of LME tone 18. Comparator/correlator 22 then correlates the returned LME tone with the delayed PRS tones. Comparator/correlator 22 may correlate electrical signals or optical signals. Where comparator/correlator 22 correlates electrical signals, LME 12 further includes an optical decoder connected between optical filter 26 and the comparator/correlator 22 for converting the optical signals output by filter 26 into electrical signals.

Comparator/correlator 22 correlates the PRS tones output by the PRS tone generator 14 with each of the returned LME tones. To perform this correlation, delay system 20 receives the PRS tones from the PRS tone generator 14 and outputs a plurality of delayed PRS tones to comparator/correlator 22. Delay system 20 outputs each PRS tone after the time delays corresponding to each repeater. In other words, delay system 20 delays the PRS tones based on the location of each repeater. This process is repeated for each PRS tone received by the delay system 20. Comparator/correlator 22 compares or correlates the delayed LME tone returned from each repeater with correspondingly delayed PRS tones generated by PRS tone generator 14.

The correlation techniques employed by comparator/correlator 22 reduce system noise and differentiate the returned signals from different repeaters. These techniques look for a high degree of correlation between the delayed PRS tones with the returned LME tones. For a strong correlation to occur, the delay of the delayed PRS tones must match the unique delay through the repeater being measured. To obtain accurate correlations, the data from the returned signals are averaged over a period of time, which typically ranges from about a half hour (when the monitoring is performed while the system is out of service) to about eight hours (when the monitoring is performed while the system is in-service).

Using digital signal processing techniques the LME can process the gain values from all the repeaters simultaneously. The LME routinely records the values of the loop-back gains of a line pair at regular intervals during routine in-service monitoring. Changes in these gain values can be used to locate cable faults, slowly degrading spans and degradations that are spread over several repeater spans. Because the correlation techniques employ time-averaged data, faults and degradations that occur on an intermittent basis (i.e., a time period less than the time over which the data is averaged) cannot be located. These techniques are therefore primarily used to locate static faults.

In accordance with the present invention, intermittent faults can be located by correlating the LMS monitoring data provided by the comparator/correlator 22 with transmission performance data (e.g., bit error rates) stored in the transmission system terminals, which essentially maintain a time history of transmission errors for diagnostic purposes. The errors may be found while the system is in-service using a variety of techniques including SONET overhead data, forward error correcting (FEC) metrics, or any overhead correction method. Virtually all transmission systems employ a transmission quality metric of some type than can be used to determine the history of transmission errors which arise in service. If the system is out of service, a bit error rate test set can be used to find transmission errors.

Figure 2:
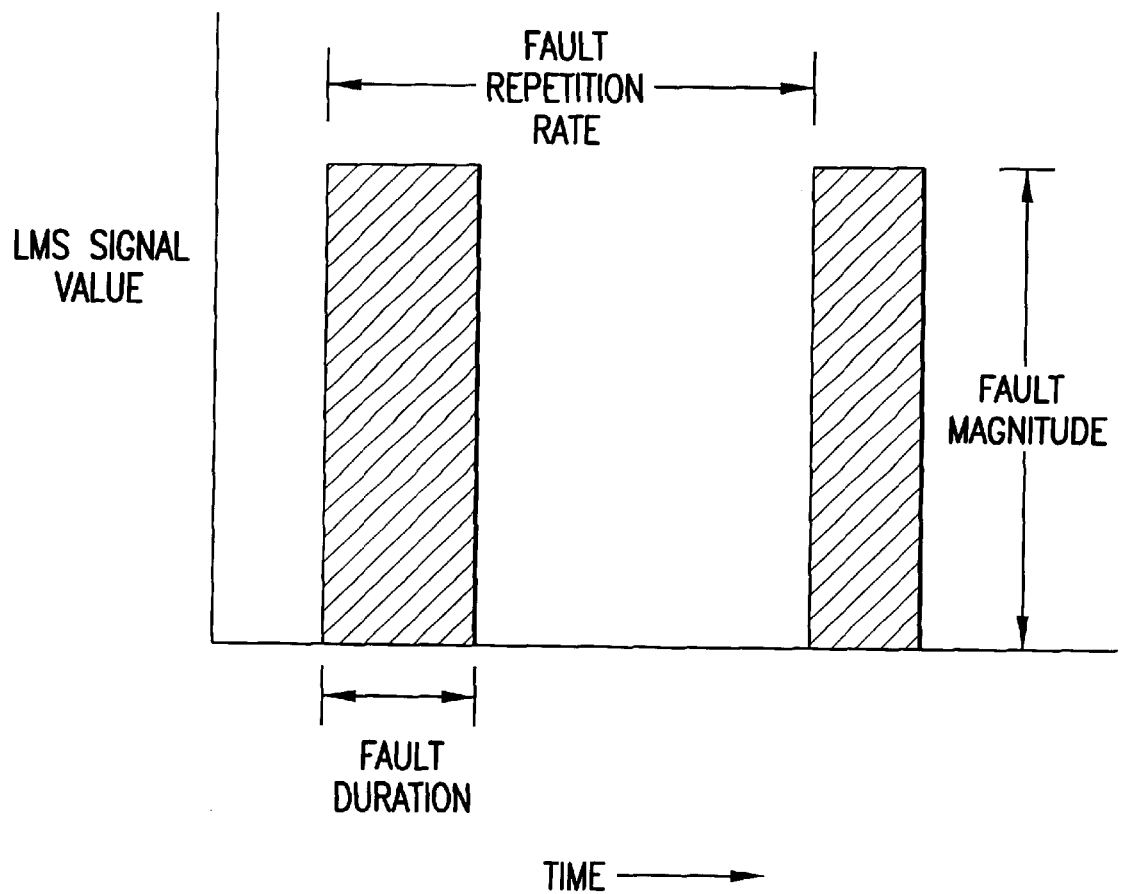
FIG. 2 shows the parameters used to define an intermittent fault.

For the purposes of the present invention, an intermittent fault may be defined by three parameters, as shown in FIG. 2. These parameters are the fault magnitude, duration and repetition rate. The magnitude of the intermittent fault is defined as the change in magnitude of the gain of the LMS monitoring data generated by comparator/correlator 22. In practice, an isolated intermittent fault must have a large magnitude to significantly affect the performance of a communication system employing optical amplifiers so that a transmission error is recorded. In a 9,000 km system, for example, the intermittent fault requires a change in gain of at least 10–20 dB. The duration of the intermittent fault is defined as the amount of time that system performance is reduced by a single fault episode. The repetition rate of the intermittent fault is defined as the time interval between the start of one fault episode and the start of the next fault episode.

The present invention may be illustrated by an experiment in which data was obtained from a test-bed in which intermittent faults were simulated. The test-bed was a 4500 km bi-directional transmission system having 262 −45 dB loop-back paths. Each optical amplifier was set to +2 dBm. The LME tone generator 14 generated a 2% (peak-to-peak) modulation signal that directly modulated a laser 16 operating at a wavelength of 1558 nm.

Baseline data was obtained with no impairments to the system over an eight hour period, with a four second averaging time for each measurement. Intermittent faults were then introduced into the baseline data by simulating the effects of error bursts occurring on the transmission line.

In the first simulation the intermittent fault had a magnitude of 25 dB with a four second duration and a thirty minute repetition rate. The total measurement time was eight hours. The fault was assumed to cause a loss of transmission data in the receiving terminal, creating roughly $10^8$ errors per four second interval, which is the duration of the fault.

FIG. 3(a) shows the LMS monitoring data from the repeater located at the site of the fault. Data from two of the eight hours of measurements are shown. The "x"s represent data collected under normal operating conditions and the "o"s correspond to data collected during the fault. FIG. 3(b) shows the transmission performance data (i.e., the bit error rate over a four second interval) for the same two hour period. Visual inspection of FIGS. 3(a) and 3(b) clearly confirm that the repeater from which the LMS monitoring data was obtained is indeed located at the site of the fault. That is, the transmission performance data is highly correlated with the LMS monitoring data.

Figure 4:
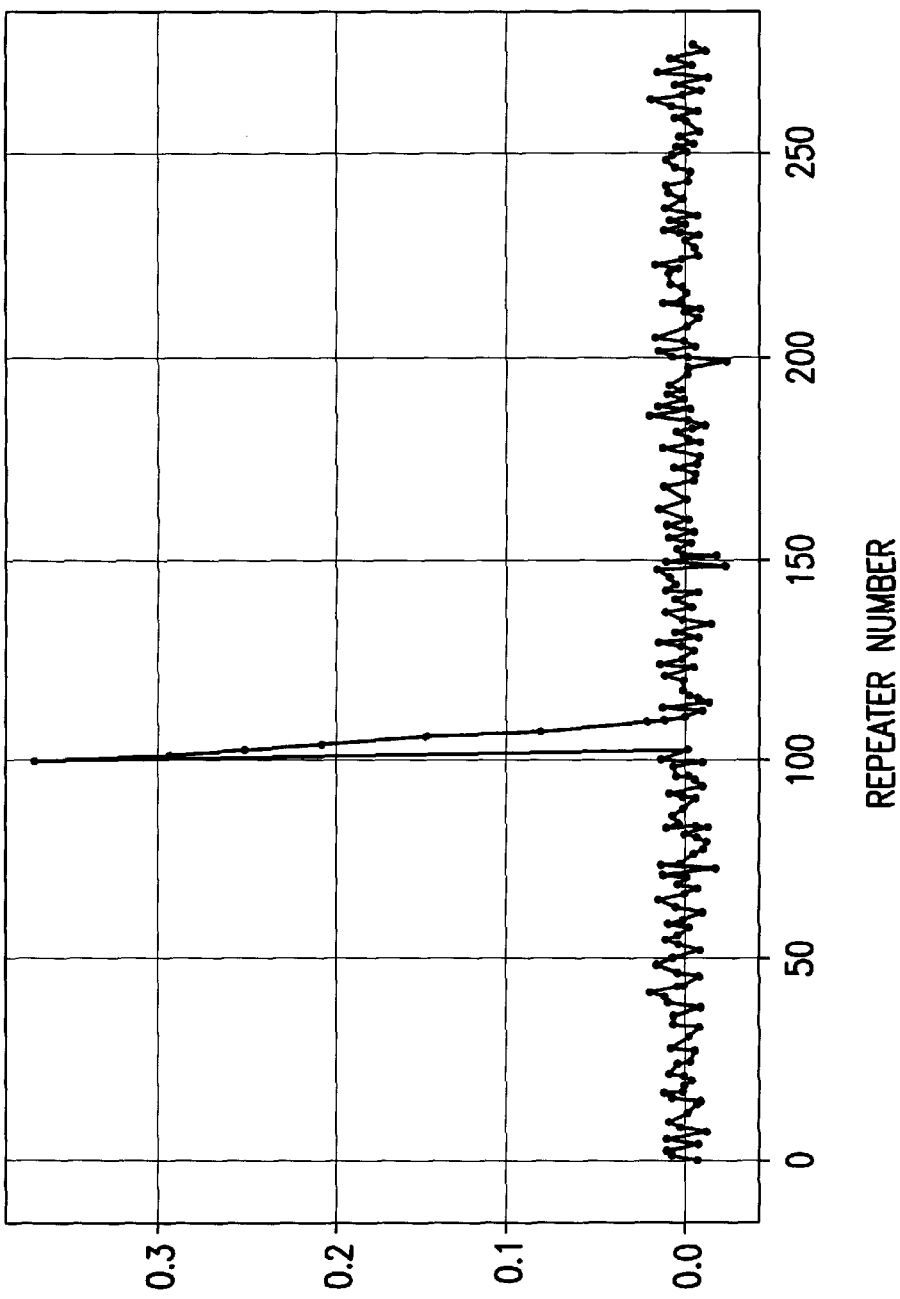
FIG. 4 shows a correlation plot in which the correlation coefficient for each repeater employed in the system of FIGS. 3(a) and 3(b) is graphically illustrated.

Assuming the site of the intermittent fault were unknown, the present invention can locate the fault by obtaining LMS monitoring data such as shown in FIG. 3(a) from the other repeaters in the system. By correlating this LMS data in time with the transmission performance data such as shown in FIG. 3(b), a correlation plot for the entire system may be derived. FIG. 4 shows the resulting correlation plot in which the correlation coefficient for each repeater is graphically illustrated. That is, FIG. 4 shows the statistically derived likelihood that the intermittent fault is located at each repeater site. Visual inspection of FIG. 4 correctly indicates that the fault is located at repeater number 101, since the correlation coefficient for this repeater is substantially greater than for any other repeater.

Of course, in practice, intermittent faults may not exhibit such regular behavior as exhibited by the fault in the first simulation presented above. More typically, there will be some variance in the duration, repetition rate and the magnitude of the fault. Additional simulations have demonstrated that the location of an intermittent fault can be determined even when the duration and repetition rate vary by a considerable amount. Moreover, there is a tradeoff between the duration and repetition rate of the fault. In other words, as the repetition rate decreases, the duration of the fault must increase to maintain the same correlation coefficient for a given fault location. If the repetition rate were to decrease without a commensurate increase in the duration, the correlation coefficient would be reduced.

It is possible to locate an intermittent fault having an arbitrary repetition rate by concatenating together a series of correlated data obtained from different sets of measurements. When measurements are concatenated together, the ability to locate the fault depends on only the magnitude and duration statistics. However, if the repetition rate of the fault is on average very long, it may take an impractical length of time to obtain sufficient statistics to perform the correlation.

Although various embodiments are specifically illustrated and described herein, it will be appreciated that modifications and variations of the present invention are covered by the above teachings and within the purview of the appended claims without departing from the spirit and scope of the invention. For example, the loop-back path shown in FIG. 1 is not limited to any particular configuration such as an all-optical loop back path. Rather, the loop-back path may be an electrical path or a combination of an electrical and optical path, for example. Moreover, the present invention is not limited to bi-directional communication systems that offer substantially equal bandwidth in both directions. More generally, the present invention is applicable to any bi-directional communication system such as a cable television system in which the bandwidth is relatively large in one direction and relatively small in the other.

What is claimed is:

1. A method for locating an intermittent fault occurring in an optical transmission system having a plurality of repeaters extending along first and second optical transmission paths for supporting bi-directional communication, said method comprising the steps of:
   a. measuring gain imparted to a test signal along a round trip path between its originating point and each repeater;
   b. identifying for each repeater changes in gain beyond a prescribed threshold and the time when said gain changes occur;
   c. receiving a record of transmission performance data occurring over time;
   d. establishing for each repeater a correlation in time between said identified gain changes and said transmission performance data;
   e. identifying a fault location based on the correlation established in step (d).

2. The method of claim 1 wherein said test signal is an optical wavelength modulated by a pseudo-random sequence.

3. The method of claim 1 wherein the step of measuring gain is performed in-service.

4. The method of claim 1 wherein the step of measuring gain is performed out-of-service.

5. The method of claim 1 wherein said transmission performance data is a bit error rate.

6. The method of claim 1 wherein said transmission performance data is determined from SONET overhead data.

7. The method of claim 1 wherein said transmission performance data is determined from forward error correcting metrics.

8. The method of claim 1 wherein said intermittent fault has a nonuniform repetition rate.

9. The method of claim 1 wherein the step of measuring gain includes the steps of:
   generating an optical test signal based on a pseudo-random sequence tone;
   combining the test signal with a data signal traveling on the first transmission path of said transmission system;
   coupling a portion of said combined test and data signal through a loop-back path associated with a repeater situated along the first and second transmission paths so that a returning signal travels along the second transmission path;
   receiving at least a portion of said returning signal and a delayed rendition of said test signal that is delayed in time based on a location of said repeater.

10. The method of claim 1 wherein the step of identifying gain changes includes the step of correlating a returning test signal and a delayed rendition of said test signal to determine a value of gain imparted to said test signal along its round trip path between its originating point and the repeater.

11. The method of claim 9 wherein the step of identifying gain changes includes the step of correlating said returning signal and said delayed rendition of said test signal to determine a value of gain imparted to said test signal along its round trip path between its originating point and the repeater.

12. The method of claim 10 wherein the step of correlating the returned test signal is performed by averaging data from returning signals measured over a period of time.

13. The method of claim 12 wherein said period of time is between about a half hour and eight hours.

14. The method of claim 12 wherein said intermittent fault is recurrent over a time less than said period of time over which the returned test signal is averaged.

15. A method for locating an intermittent fault in an optical transmission system having first and second optical transmission paths for supporting bi-directional communication, said method comprising the steps of:

generating an optical test signal based on a pseudo-random sequence tone;

combining the test signal with a data signal traveling on the first transmission path of said transmission system;

coupling a portion of said combined test and data signal through a loop-back path associated with a repeater situated along the first and second transmission paths so that a returning signal travels along the second transmission path;

receiving at least a portion of said returning signal and a delayed rendition of said test signal that is delayed in time based on a location of said repeater;

correlating said returning signal and said delayed rendition of said test signal to determine a value of gain imparted to said test signal along its round trip path between its originating point and the repeater;

correlating said gain values with transmission performance data stored in a receiving terminal to determine a fault location.

16. The method of claim 15 wherein said data signal is a WDM signal comprising a plurality of channels.

17. The method of claim 15 wherein said loop-back path is all optical path.

18. The method of claim 15 wherein said loop-back path is an electrical path.

19. The method of claim 15 wherein said loop-back path is in part an electrical path.

20. The method of claim 15 wherein said receiving step comprises the step of filtering out the data signal so that the returning signal is a returning test signal.

21. The method of claim 15 wherein a delay imparted to said delayed rendition of the test signal is based on a path length to the repeater.

22. The method of claim 15 wherein the step of correlating the returned signal is performed by averaging data from returning signals measured over a period of time.

23. The method of claim 22 wherein said period of time is between about a half hour and eight hours.

24. The method of claim 22 wherein said intermittent fault is recurrent over a time less than said period of time over which the returned signal is averaged.

25. The method of claim 15 wherein said transmission performance data is a bit error rate.

26. The method of claim 15 wherein said transmission performance data is determined from SONET overhead data.

27. The method of claim 15 wherein said transmission performance data is determined from forward error correcting metrics.

28. The method of claim 15 wherein said intermittent fault has a nonuniform repetition rate.

29. The method of claim 15 wherein the gain determination is performed in-service.

30. The method of claim 15 wherein the gain determination is performed out-of-service.

* * * * *